(12) United States Patent
Feng et al.

(10) Patent No.: US 8,837,847 B2
(45) Date of Patent: Sep. 16, 2014

(54) DETERMINING FOCAL LENGTHS OF PHOTOGRAPHS

(75) Inventors: Dong Feng, Beijing (CN); Jingyuan Bai, Beijing (CN)

(73) Assignee: Adobe Systems Incorporated, San Jose, CA (US)

( * ) Notice: Subject to any disclaimer, the term of this patent is extended or adjusted under 35 U.S.C. 154(b) by 217 days.

(21) Appl. No.: 13/551,427

(22) Filed: Jul. 17, 2012

(65) Prior Publication Data
US 2014/0022435 A1    Jan. 23, 2014

(51) Int. Cl.
*G06K 9/46* (2006.01)
*H04N 5/232* (2006.01)

(52) U.S. Cl.
USPC .......................................... 382/244; 348/346

(58) Field of Classification Search
CPC ..................................................... G06T 3/0018
See application file for complete search history.

(56) References Cited

U.S. PATENT DOCUMENTS

| | | | |
|---|---|---|---|
| 6,985,183 B2* | 1/2006 | Jan et al. | 348/335 |
| 7,193,633 B1 | 3/2007 | Reinhardt et al. | |
| 7,602,404 B1 | 10/2009 | Reinhardt et al. | |
| 8,194,993 B1* | 6/2012 | Chen et al. | 382/254 |
| 8,320,670 B1* | 11/2012 | Li et al. | 382/168 |
| 8,368,773 B1* | 2/2013 | Jin | 348/222.1 |
| 8,391,640 B1* | 3/2013 | Jin | 382/284 |
| 2007/0098296 A1* | 5/2007 | Souchard | 382/275 |
| 2009/0141966 A1 | 6/2009 | Chen et al. | |
| 2010/0318914 A1 | 12/2010 | Zitnick, III et al. | |
| 2011/0122149 A1 | 5/2011 | Souchard | |

OTHER PUBLICATIONS

Friel et al., "Automatic calibration of fish-eye cameras from automotive video sequences", IET Intelligent Transport Systems, 2010, vol. 4, iss.2, pp. 136-148.*
Ali Azarbayejani and Alex Pentland, "Recursive Estimation of Motion, Structure, and Focal Length," IEEE Transactions on Pattern Analysis and Machine Intelligence 17 (6), pp. 562-575, Jun. 1995.

* cited by examiner

*Primary Examiner* — Anand Bhatnagar
*Assistant Examiner* — Soo Park
(74) *Attorney, Agent, or Firm* — Wolfe-SBMC

(57) ABSTRACT

A method, system, and computer-readable storage medium are disclosed for determining focal lengths of photographs. Image content is displayed in a graphical user interface. The image content is derived from a photograph taken with a lens having a focal length. The focal length is unknown when the image content is initially displayed. A user interface control is displayed in the graphical user interface. The user interface control is displayed on or proximate to the image content. User input comprising a change in position of the user interface control is received. The focal length is determined based on the change in position of the user interface control.

20 Claims, 7 Drawing Sheets

DETERMINING FOCAL LENGTHS OF PHOTOGRAPHS

BACKGROUND

1. Field of the Invention

The present invention is directed to computer systems; and more particularly, it is directed to digital photography.

2. Description of the Related Art

Digital photographs are typically digital images comprising raster graphics data. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green, blue) color space may comprise between one and eight bits per pixel for each of the red, green, and blue channels. An alpha channel may be used to store additional data such as per-pixel transparency values.

Digital image processing is the process of analyzing and/or modifying digital images using a computing device, e.g., a computer system. Using specialized software programs, digital images may be manipulated and transformed in a variety of ways. When processing digital photographs, the focal length associated with the photograph is an important characteristic. Many types of digital image processing depend on the accuracy of the focal length value to generate a correct result.

Accordingly, it is desirable to accurately estimate or otherwise obtain the focal length associated with a photograph if the correct focal length is not already known (i.e., as a part of metadata generated upon capture of a digital photo). In image processing application software, the typical interface for specifying the focal length of photographs includes an input field in which the numerical value of the focal length may be entered by a user. Additionally, the user may use a trial-and-error approach to determine the focal length. When the user does not know the focal length of a photograph, the user may make an initial guess, enter the guessed value, process the image with that estimated value to see if the result is acceptable, and then adjust the initial estimate according to the user's judgment. The trial-and-error process may be repeated until the result is acceptable to the user.

SUMMARY

Various embodiments of systems, methods, and computer-readable storage media for determining focal lengths of photographs are disclosed. Image content may be displayed in a graphical user interface, wherein the image content is derived from a photograph taken with a lens having a focal length. The focal length may be unknown when the image content is initially displayed. A user interface control may be displayed in the graphical user interface, wherein the user interface control is displayed on or proximate to the image content. User input comprising a change in position of the user interface control may be received. The focal length may be determined based on the change in position of the user interface control.

In one embodiment, the lens comprises a fisheye lens, and the image content comprises a curvature distortion introduced by the fisheye lens. User input may be entered to change the position of the user interface control in order to match a curve of a line to the curvature distortion. The fisheye lens may be modeled using a stereographic projection model. To determine the focal length, a hypothesized focal length of the stereographic projection model may be modified based on the user input to change the position of the user interface control.

In one embodiment, the lens comprises a rectilinear lens, and the image content comprises a rectilinear distortion introduced by the rectilinear lens. User input may be entered to change the position of the user interface control in order to minimize the rectilinear distortion. The rectilinear lens may be modeled using a perspective projection model. To determine the focal length, a hypothesized focal length of the perspective projection model may be modified based on the user input to change the position of the user interface control.

Figure 1:
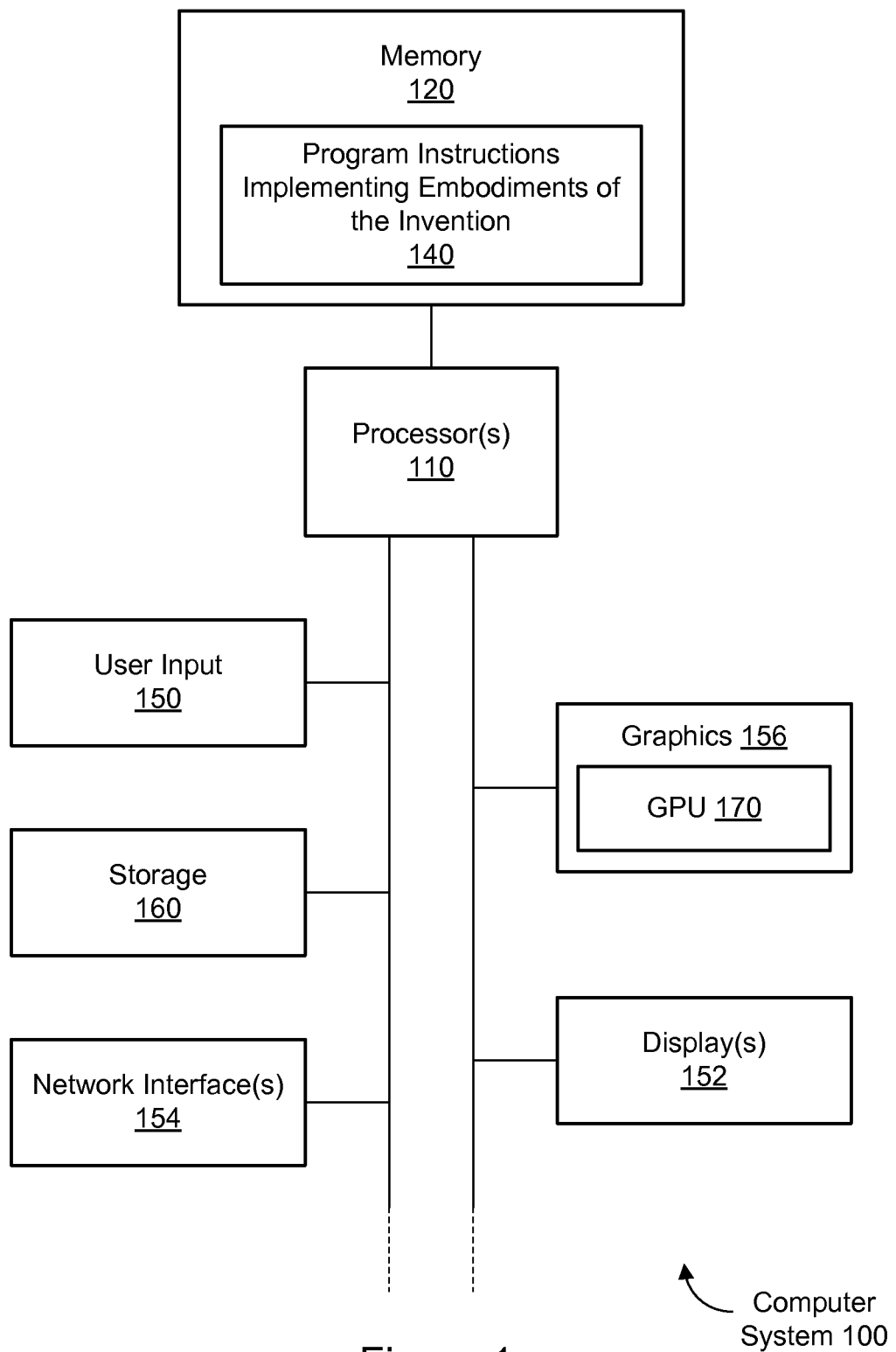
FIG. 1 is a block diagram of an example system configured to implement embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm as described herein, is generally considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the systems and methods described herein may be used to determine focal lengths of photographs. FIG. 1 is a block diagram illustrating constituent elements of a computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In one embodiment, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In one embodiment, one or more display devices 152 may be coupled to the graphics component 156 for display of data provided by the graphics component 156.

In one embodiment, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

In one embodiment, a user may specify the focal length of a photograph by manipulating the content of the photograph via user input. The focal length may be automatically determined based on the user input. In one embodiment, the photograph may be a fisheye photograph. The fisheye photograph may be taken with a fisheye lens, i.e., a wide-angle lens that produces a fisheye curvature distortion by taking in a broad and panoramic image. In one embodiment, the photograph may be a rectilinear photograph. The rectilinear photograph may be taken with a rectilinear lens, i.e., a photographic lens that yields images in which straight features usually appear with straight lines rather than curved lines. However, at very wide angles, the rectilinear lens may cause objects near the edge of the frame to appear increasingly stretched and enlarged. The rectilinear photograph may have a large field of view. The rectilinear photograph may be referred to as a perspective photograph based on a forced perspective effect in which objects in the photograph appear farther away, closer, larger, or smaller than in reality.

The focal length of a photograph is typically an attribute of the lens used to take the photograph. Generally, the focal length may be described as the distance over which initially collimated rays are brought to a focus. Therefore, a lens with a shorter focal length brings rays to focus in a shorter distance than a lens with a longer focal length. A longer focal length may result in higher magnification and a narrower angle of view, whereas a shorter focal length may result in a wider angle of view. Due to the popularity of the 35 mm standard in analog photography, the focal length associated with a digital photograph may be expressed in terms of a 35 mm equivalent focal length, even though digital cameras often use sensors smaller than 35 mm film. The 35 mm equivalent focal length is the focal length of a lens that would have the same angle of view if used on a full-frame 35 mm camera. The focal length of a camera lens is typically expressed in millimeters.

The photograph for which the focal length is determined may comprise a digital image. A digital image may comprise a plurality of pixels, typically arranged in a grid. The digital image may be acquired using a digital camera or by digitally scanning an analog photograph.

In one embodiment, the focal length may be determined based on user input combined with a stereographic projection model. A stereographic projection is a mapping of a sphere onto a plane. The optical characteristics of most fisheye lenses are very close to those of stereographic projection models with appropriate parameters. In the images constructed by a stereographic projection model from a real world scene, straight lines may appear curved in a manner similar to photos shot using a fisheye lens. Given an image constructed by a stereographic projection model, the projection model itself, and two points on the image which represent the projection of the two endpoints of a straight line in the real world scene, the points on the image representing the projection of the entire straight line may be computed.

Similarly, the optical characteristics of most rectilinear lenses are very close to those of perspective projection models with appropriate parameters. In the images constructed by a perspective projection model from a real world scene, object shapes may have local distortion of the same type seen in a rectilinear photograph. The further an area is from the center of the rectilinear photo, the greater the stretching distortion will be in the area. Therefore, the most serious distortion tends to happen at the corners of a rectilinear photo.

In one embodiment, a preview of a photo may be displayed using a graphical user interface (GUI). Unlike prior approaches, an input field for direct entry of the focal length by a user may not be provided. In one embodiment, the concept of the focal length may even be hidden from the user. Instead of allowing the user to enter the focal length directly (i.e., by specifying a numerical value), the GUI may allow the user to intuitively manipulate one or more user interface elements displayed with the preview of the photo. The focal length may then be determined automatically and accurately based on the user input received during the manipulation.

As determined using the systems and methods described herein, the focal length may then be used in performing subsequent image processing operations. For example, once the focal length is known, a photo may be converted from a fisheye perspective to a rectilinear perspective or vice versa. As an additional example, the focal length of multiple photos may be used in stitching each of the photos together in a single panoramic image.

Figure 2:
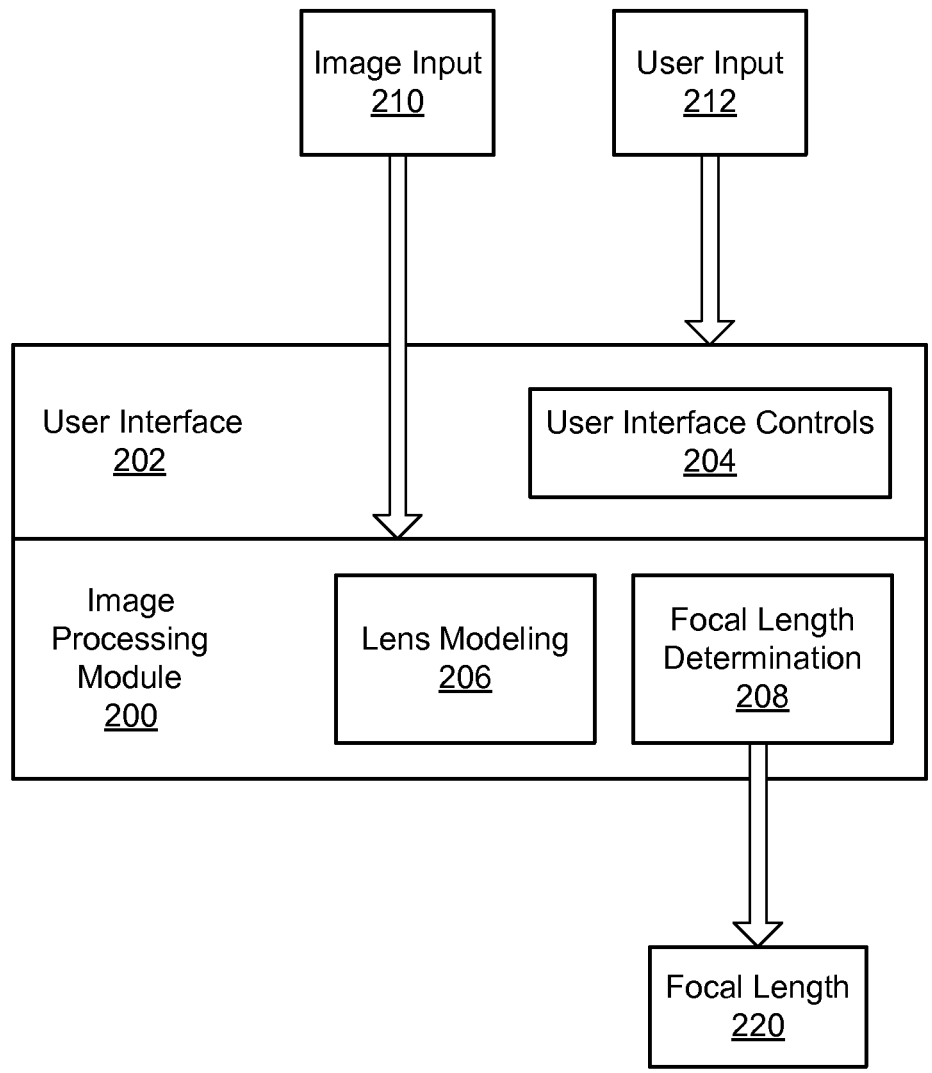
FIG. 2 illustrates an example of an image processing module configured for determining focal lengths of photographs, according to one embodiment.

FIG. 2 illustrates an example image processing module that may implement embodiments of methods for determining focal lengths of photos. In one embodiment, module 200 may provide a user interface 202 that includes one or more user interface elements via which a user may initiate, interact with, direct, and/or control the methods performed by module 200. The user interface 202 may comprise a GUI including one or more user interface controls 204 and one or more elements for displaying image content. Module 200 may obtain image input 210. The image input 210 may comprise a photograph for which an accurate focal length is unknown. In one embodiment, module 200 may also obtain user input 212, such as one or more instructions to perform the method for determining focal lengths of photos.

A lens modeling module 204 may be used to model a lens having an initially unknown focal length. In one embodiment, a fisheye lens may be modeled using a stereographic projection model. In one embodiment, a rectilinear lens may be modeled using a perspective projection model. As will be described in greater detail below, a focal length determination module 208 may use the user input 212 and a lens model to automatically determine of the focal length 220 of the lens that was used to take the photograph represented by the image input 210. To determine the focal length 220 of a fisheye lens, for example, a hypothesized focal length of the stereographic projection model may be modified based on user input 212 to change the position of a user interface control. To determine the focal length 220 of a rectilinear lens, for example, a hypothesized focal length of the perspective projection model may be modified based on user input 212 to change the position of a user interface control. In one embodiment, the process performed by the lens modeling module 206 may be performed automatically and/or programmatically. In one embodiment, the process performed by the focal length determination module 208 may be performed automatically and/or programmatically.

Image processing module 200 may be implemented as or in a stand-alone application or as a module of or plug-in for an image processing and/or presentation application. For example, module 200 may be implemented as a wide-angle lens correction plug-in for an image processing and/or presentation application. Further examples of types of applications in which embodiments of module 200 may be implemented may include, but are not limited to, image editing, processing, and/or presentation applications, as well as applications in security or defense, educational, scientific, medical, publishing, digital photography, digital films, games, animation, marketing, and/or other applications in which digital video image editing or presentation may be performed. Specific examples of applications in which embodiments may be implemented include, but are not limited to, Adobe® Photoshop® and Adobe® Illustrator®. In addition to generating the focal length 220, module 200 may be used to display, manipulate, modify, and/or store the focal length 220, for example to a memory medium such as a storage device or storage medium.

Figure 3:
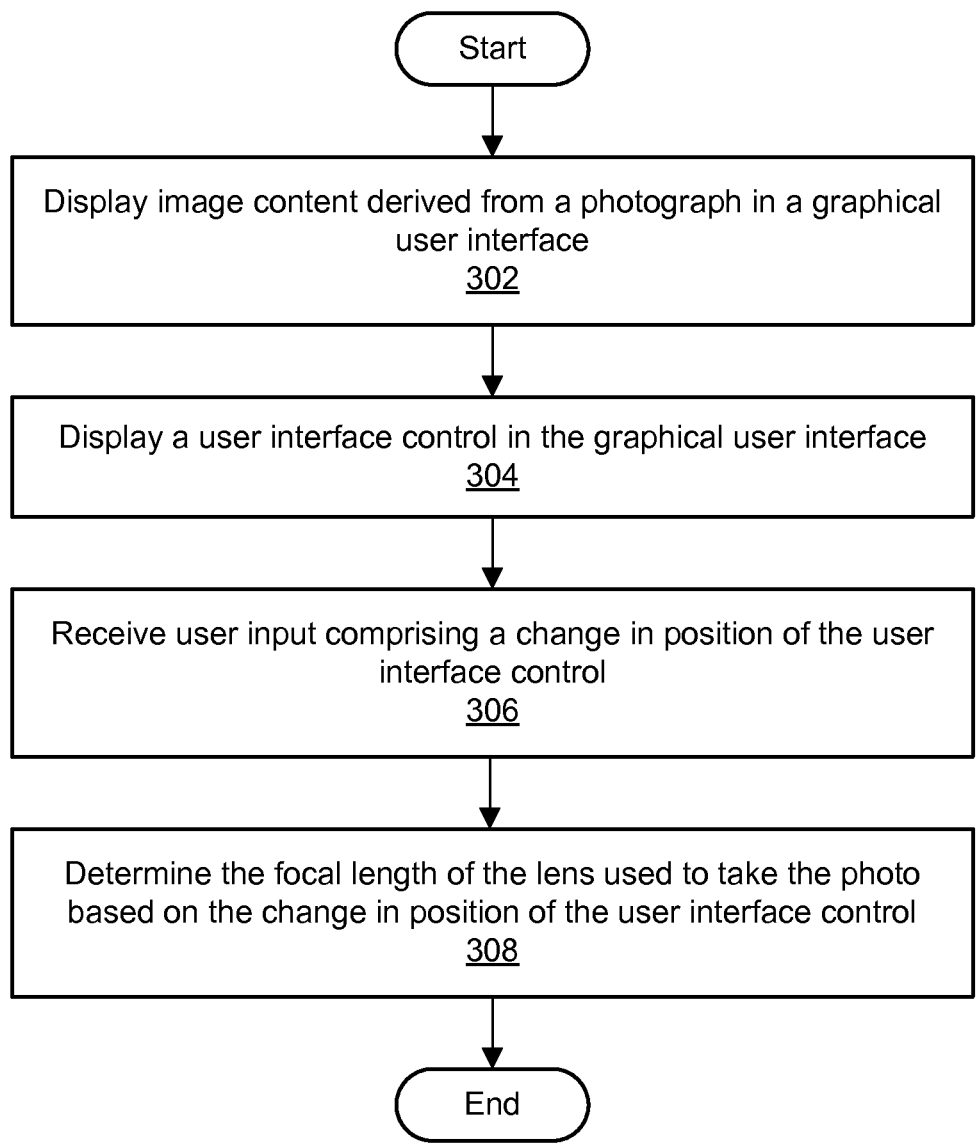
FIG. 3 is a flowchart illustrating a method for determining focal lengths of photographs, according to one embodiment.

FIG. 3 is a flowchart illustrating a method for determining focal lengths of photographs, according to one embodiment. The method shown in FIG. 3 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in 302, image content may be displayed in a graphical user interface. The image content is derived from a photograph taken with a lens having a focal length. The focal length may be unknown when the image content is initially displayed. In one embodiment, the lens comprises a fisheye lens, and the image content comprises a curvature distortion introduced by the fisheye lens. In one embodiment, the lens comprises a rectilinear lens, and the image content comprises a rectilinear distortion introduced by the rectilinear lens.

As shown in 304, a user interface control may be displayed in the graphical user interface, wherein the user interface control is displayed on or proximate to the image content. For a fisheye photograph, the user interface control may comprise a handle on a curved line (e.g., in the middle of the line) or may comprise all or part of the line itself. For example, the user interface control may comprise a series of points on the line, any one of which may be manipulated by the user to change the curve of the line. For a rectilinear photograph, the user interface control may comprise one or more handles attached to the corners of the image content.

As shown in 306, user input comprising a change in position of the user interface control may be received. For a fisheye photograph, the user may drag the handle or the line itself to change the curve of the line while leaving the endpoints in place. In this manner, the user may change the position of the user interface control in order to match a curve of a line to the curvature distortion. For a rectilinear photograph, the user may drag a handle to bring the corresponding corner of the image closer to the center of the image or further away from the center of the image. In this manner, the user may change the position of the user interface control in order to minimize the rectilinear distortion.

As shown in 308, the focal length may be determined based on the change in position of the user interface control. The fisheye lens may be modeled using a stereographic projection model. To determine the focal length of the fisheye lens, a hypothesized focal length of the stereographic projection model may be modified based on the user input to change the position of the user interface control. The rectilinear lens may be modeled using a perspective projection model. To determine the focal length of the rectilinear lens, a hypothesized focal length of the perspective projection model may be modified based on the user input to change the position of the user interface control.

Figure 4:
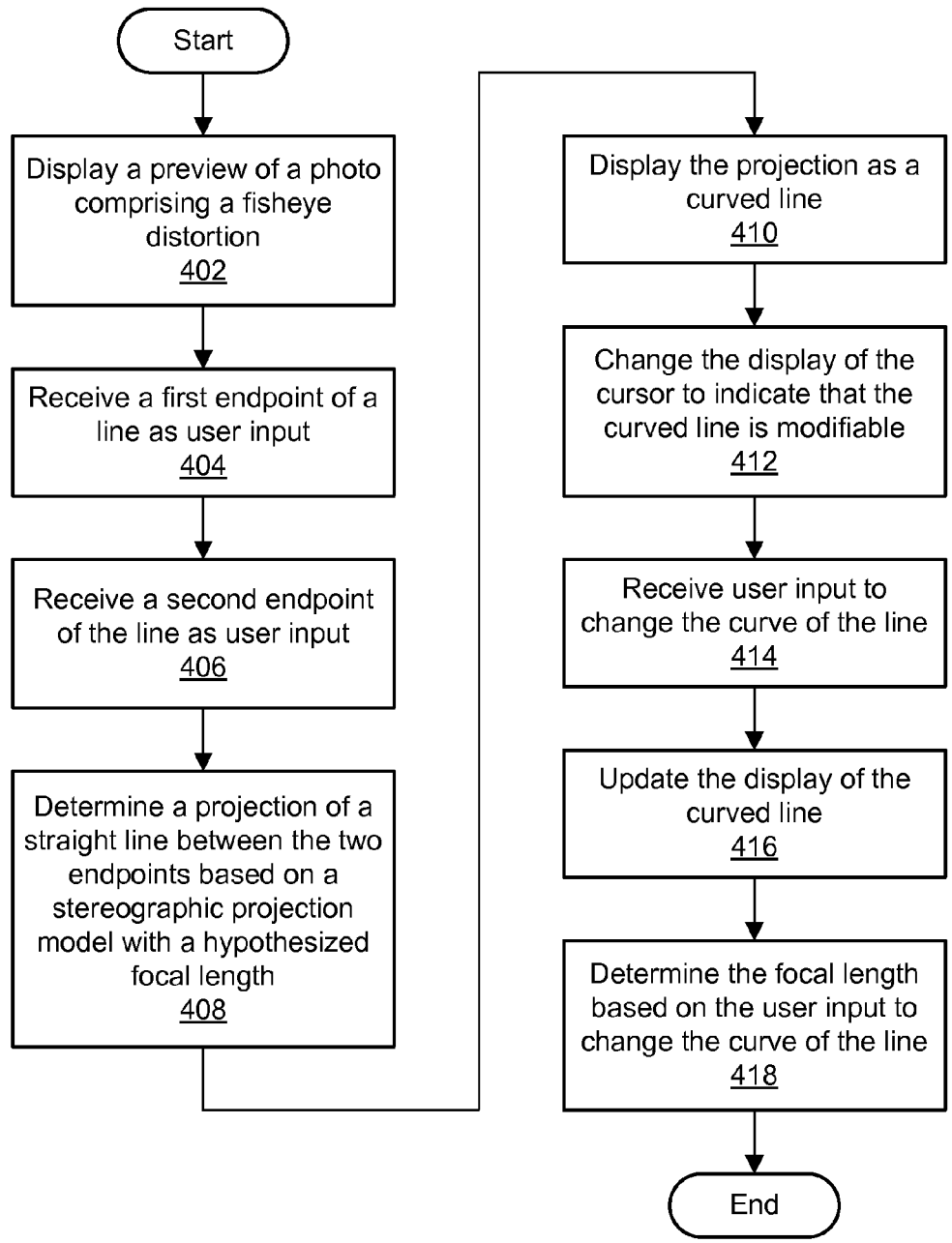
FIG. 4 is a flowchart illustrating a method for determining focal lengths of fisheye photographs, according to one embodiment.

FIG. 4 is a flowchart illustrating a method for determining focal lengths of fisheye photographs, according to one embodiment. The method shown in FIG. 4 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in 402, a preview of a photo is displayed. Any suitable element(s) of a user interface (e.g., of a GUI), including a window and its associated controls, may be used to display the preview of the photo. The photo may comprise a fisheye distortion introduced by the use of a fisheye lens.

As shown in 404, a first element of user input may be received through the user interface. The first element of user input may comprise a first location specified in the preview of the photo. The first location may be any point on a line that would be a straight line in the real world but that appears curved in the digital photo. The user may thus be expected to use his or her judgment to identify a line that is curved due to the fisheye distortion. In one embodiment, the first element of user input may be specified using any suitable input device such as a mouse, trackball, or touch-sensitive display screen.

As shown in 406, a second element of user input may be received through the user interface. The second element of user input may comprise a second location specified in the preview of the photo. The second location may be a second point on the line previously specified in the first element of user input. As discussed above, the line may be curved due to the fisheye distortion. In one embodiment, the second element of user input may again be specified using any suitable input device such as a mouse, trackball, or touch-sensitive display screen.

By entering the two points as described above, the user may specify the endpoints of a line that appears curved due to the fisheye distortion but would be a straight line in the real world scene represented by the fisheye photo. As shown in 408, the projection of the straight line may be determined automatically based on the two endpoints specified by the user. The projection of the straight line may also be determined based on a stereographic projection model with a hypothesized mathematical focal length. In one embodiment, the initial hypothesized focal length may be deduced based on any metadata associated with the photo, even if the metadata is incomplete or inaccurate. The metadata may comprise characteristics of the camera used to take the digital photo and may be obtained along with the photo. The hypothesized focal length may comprise an initial estimate of the focal length and may be determined in any suitable manner. In one embodiment, the hypothesized focal length may be determined in an arbitrary manner within a range of values that is typically associated with a fisheye lens.

In one embodiment, after the first location is specified in 404 but before the second location is specified in 406, an intermediate projection of the hypothesized straight line may be computed and updated in real time. As described above in connection with the process shown in 408, the intermediate projection may be determined based on two endpoints of a line and a stereographic projection model. The two endpoints may be the first location specified by the user along with the current position of the cursor in the preview of the digital image. In one embodiment, the intermediate projection of the line may be displayed as it is updated in real time. In another embodiment, the intermediate projection of the line may be hidden from the user until the user confirms the location of the second endpoint as shown in 406.

As shown in 410, the computed projection of the real-world straight line may be displayed. For example, the computed projection may be displayed as a solid curved line between the two points specified by the user. If the hypothesized focal length is different from the actual focal length, then the computed projection line may not match the actual projection, i.e., the actual curved line found in the digital photo and identified by the two locations specified by the user. In one embodiment, the computed projection may be displayed on top of the preview of the photo to enable the user to compare the computed projection to the actual projection.

As shown in 412, the display of the cursor may be changed to indicate that the computed projection of the line is modifiable by the user. In one embodiment, for example, the cursor may be changed to an "open hand" cursor when the user places the cursor in the vicinity of or directly over the computed projection of the line. The user may move the cursor using any suitable input device, such as a mouse, trackball, or touch-sensitive display screen. In one embodiment, a handle may be displayed on the curved line (e.g., in the middle of the line) to indicate that the line may be dragged via the handle, and the display of the cursor may be changed only when the cursor is hovering over the handle. The handle may comprise any suitable shape, such as a circle or square, which tends to indicate the modifiability of the curved line to the user.

To assist in determining the focal length associated with the photo, the user may drag the projection of the line so that it matches the actual curved line in the photo. As shown in 414, user input may be received to change the curve of the line. In one embodiment, when the user begins to modify the projection of the line, the cursor may change from an open hand to a closed hand. As the user drags the cursor to modify the curved line, the endpoints of the line may remain unchanged.

As shown in 416, the display may be updated in response to the user input received in 414. In one embodiment, as the line is dragged, new parameters of a hypothesized stereographic projection may be computed and updated in real time according to the two endpoints of the initial curved line and the current mouse position. Based on these parameters, a new hypothesized curved line may be computed and displayed. For example, the new hypothesized curved line may be displayed as semi-transparent curved line. In this manner, visual feedback may be provided to the user as the user continues to drag the line to match the actual curved line in the photo. In one embodiment, the visual feedback may include a semi-transparent projection line that is computed, displayed, and updated in real time. In another embodiment, only the handle may be updated to indicate the desired movement as specified by the user input.

As shown in 418, the focal length of the photo may be determined based on the user input received in 414. In on embodiment, the user may stop dragging the line when the user perceives that the dragged curved line or dragged handle is located on top of the actual projection of the straight line in the photo. In the case of the dragged curved line, the parameter of the current hypothesized stereographic projection may be taken as the mathematical focal length of the photo. In the case of the dragged handle, the mathematical focal length may be computed based on the two endpoints and the location where the drag ends. In this manner, the user may perform an intuitive "drag to match" operation to accurately determine the focal length associated with a photo. Similar techniques may be applied for images having curvature distortions, even if the images are not fisheye images.

Figure 5A:
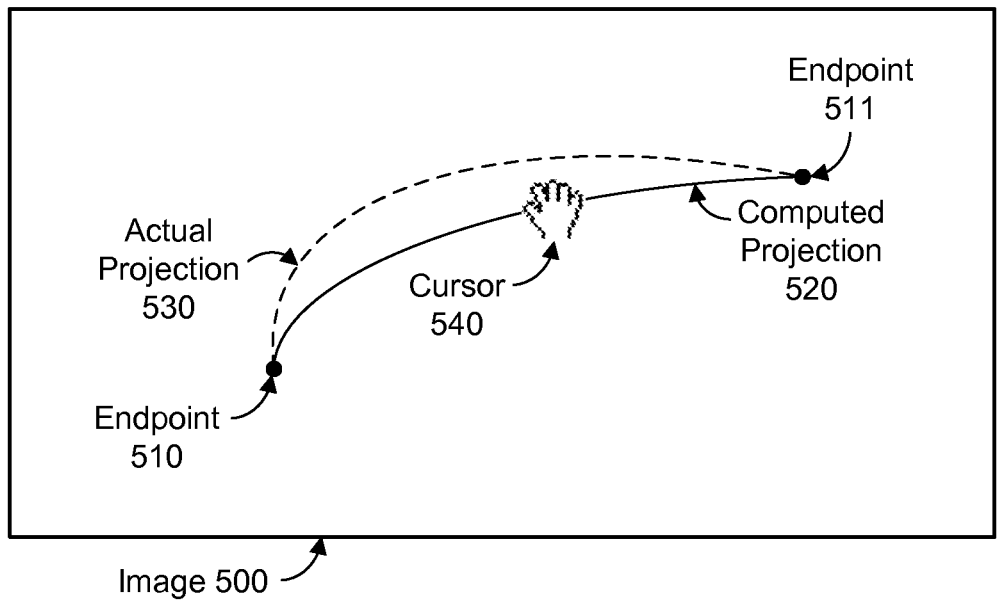
FIGS. 5A and 5B illustrate an example of a computed projection of a real-world straight line in the determination of the focal length of a fisheye photograph, according to one embodiment.
Figure 5B:
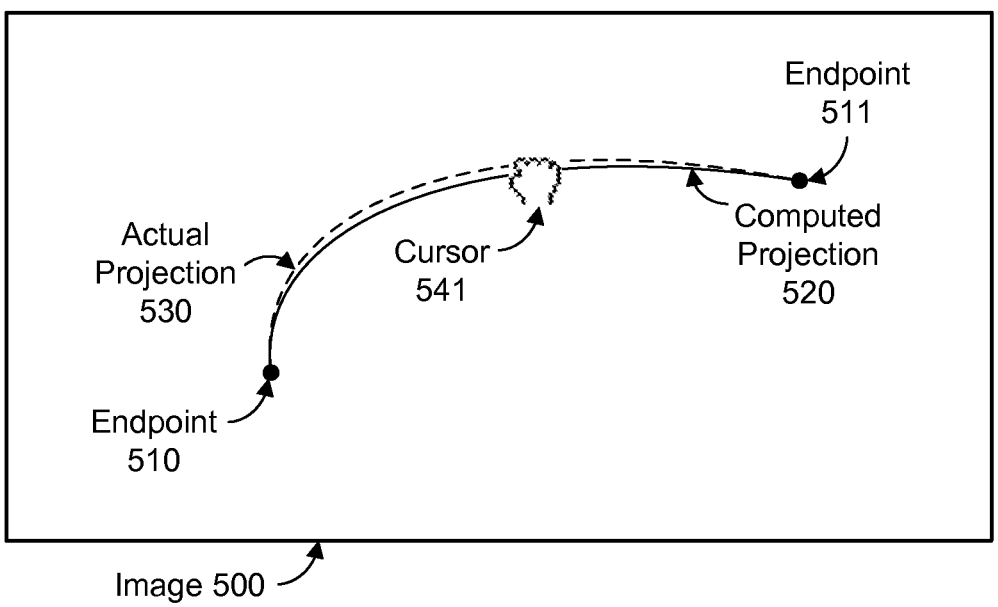

FIGS. 5A and 5B illustrate an example of a computed projection of a real-world straight line in the determination of the focal length of a fisheye photograph, according to one embodiment. As shown in FIG. 5A, an image (e.g., a preview photo) 500 may be displayed in a graphical user interface. Two endpoints 510 and 511 may be entered by a user. Based on the endpoints, a projection of a straight line may be determined based on a stereographic projection model with a hypothesized mathematical focal length. As shown in the example, the computed projection 520 is depicted as a solid curved line, and the actual projection 530 as found in the digital photo is depicted as a dashed curved line. However, any suitable technique for depicting the lines may be used. As discussed above, the cursor may be changed to indicate that the computed projection 520 is modifiable. As shown in FIG. 5A, for example, the cursor may be changed to an "open hand" cursor 540. As shown in FIG. 5B, the user may move the computed projection 520 to match the actual projection 530 as closely as the user can manage. When the user begins to move the computer projection 520, the cursor may change again to a "closed hand" cursor 541. As shown in FIGS. 5A and 5B, all or part of the computed projection 520 may act as a user interface control to permit the modification of its curve. In another embodiment, a handle may be displayed (e.g., in the middle of the computed projection 520) that the user may grab and drag in order to change the curve of the computed projection 520.

Figure 6:
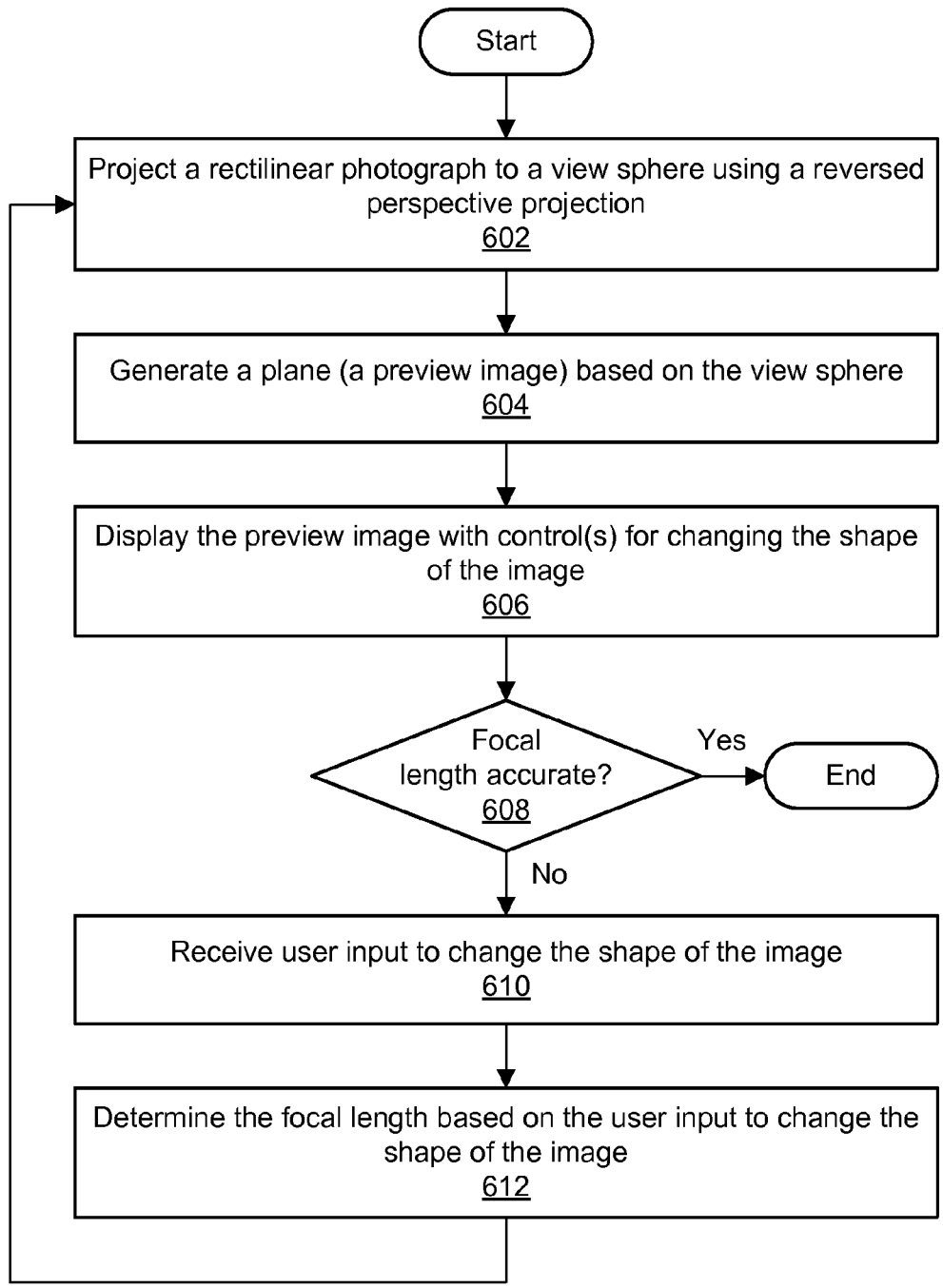
FIG. 6 is a flowchart illustrating a method for determining focal lengths of rectilinear photographs, according to one embodiment.

FIG. 6 is a flowchart illustrating a method for determining focal lengths of rectilinear photographs, according to one embodiment. The method shown in FIG. 6 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As shown in 602, a rectilinear photo may be projected back to a view sphere using a reversed perspective projection. The rectilinear photo may comprise a rectilinear distortion introduced by the use of a rectilinear lens. The radius of the view sphere is the focal length. Because the focal length is unknown at this stage, an arbitrary initial value may be used for the focal length to generate the view sphere.

As shown in 604, the view sphere may be unwound to generate a plane. The plane represents a preview image that may be manipulated by the user to find the focal length, as discussed below. In unwinding the view sphere, distortion may be minimized by adapting the projection to the content, such as salient regions and lines, in order to preserve their shape. A spatially-varying projection may be computed that respects user-specified constraints while minimizing a set of energy terms that measure wide-angle image distortion.

Because the most stretching distortion tends to occur at the corners, the corners of the preview image may be somewhat shrunken in comparison to the original image. The shrinking distortion will tend to be closer to the center of the preview image for a smaller initial focal length than for a larger initial focal length. Through observation of the preview image, a user may judge whether the local distortion at the corners has been sufficiently removed to result in a natural appearance. If the initial focal length used in the process shown in 602 is too small, then the objects close to the corners will be excessively shrunken. However, if the initial focal length used in the process shown in 602 is too large, then the objects close to the corners will appear stretched.

As shown in 606, the preview image may be displayed along with one or more user interface elements permitting the shape of the preview image to be changed. In one embodiment, a handle or other suitable interface element may be displayed on each corner of the preview image.

As shown in 608, if the estimate of the focal length is considered to be sufficiently accurate, then the process may end. However, if the focal length reflected by the image preview is not determined by the user as accurate, then the process may continue as shown in 610 for further adjustment of the estimate of the focal length. The accuracy of the estimate of the focal length may be determined based on how "natural" the image content appears with the four corners shrunken inward. In other words, the estimate of the focal length may be considered sufficiently accurate for the process to end if the stretching and enlarging effect is counteracted by the shrinking of the corners inward. In one embodiment, the determination of accuracy as shown in 608 may include receiving user input to either end the process or further adjust the estimate of the focal length.

As shown in 610, user input may be received to change the shape of the preview image. In one embodiment, the user input may comprise user input to move one or more of the handles in the corners of the preview image. For example, any of the handles may be dragged by the user using any suitable input device, such as a mouse, trackball, or touch-sensitive display screen. In one embodiment, as any one of the handles is dragged closer to the center of the preview image, all of the handles may be moved closer to the center of the preview image by the same extent. Similarly, as any one of the handles is dragged further from the center of the preview image, all of the handles may be moved further from the center of the preview image by the same extent.

As shown in 612, the focal length may be determined automatically based on the user input received in 610. If the new location of the dragged corner is more distant from the center than the original corner, then the focal length used to generate the preview image is increased. On the other hand, if the new location is closer to the center, then the focal length is decreased. Using the new focal length determined in 612, the operations shown in 602, 604, and 606 may be repeated to generate a new preview image. Any suitable method may be used for this iterative solution finding approach, e.g., Gaussian approximate, Newton-Laplacian approximate, or linear approximate. In this manner, the user may perform an intuitive "drag corner to restore natural shape" operation to accurately determine the focal length associated with a photo.

Figure 7:
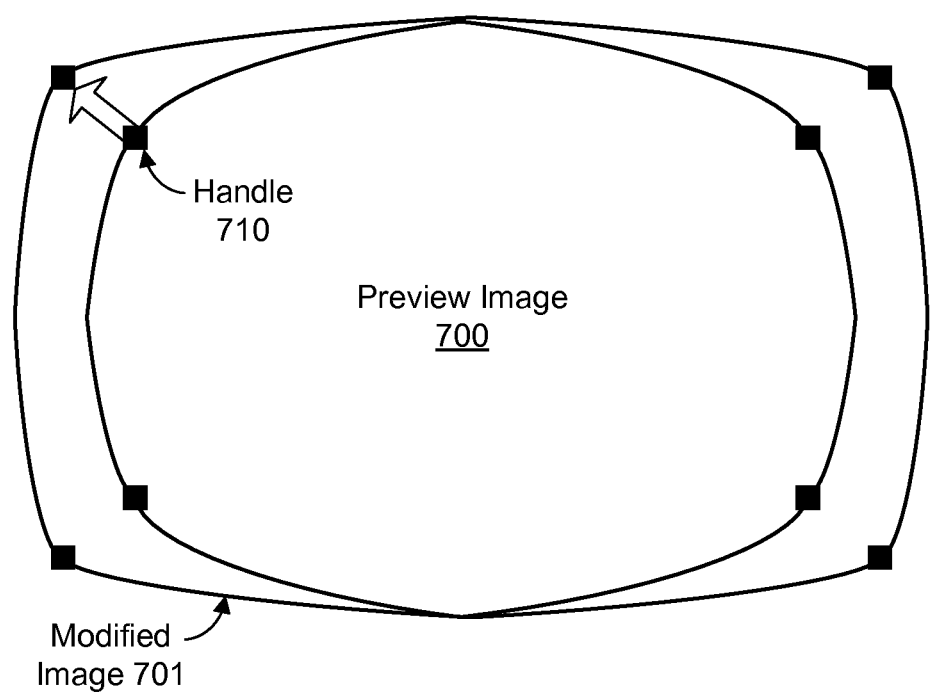
FIG. 7 illustrates an example of a user interface for determining the focal length of a rectilinear photograph, according to one embodiment.

FIG. 7 illustrates an example of a user interface for determining the focal length of a rectilinear photograph, according to one embodiment. A preview image 700 based on a rectilinear photograph may be displayed in a graphical user interface. One or more user interface controls, such as a handle 710, may be displayed with the preview image 700. As shown in the example of FIG. 7, the user may grab and drag the handle 710 outwards to reposition the handle 710. Based on the change in position of the handle 710, a new focal length may be determined as shown in 610, and a modified image 701 may be generated and displayed. Alternatively, the handle 710 may be moved closer to the center of the preview image 700.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
displaying image content in a graphical user interface, the image content derived from a photograph taken with a lens having a focal length that is unknown when the image content is initially displayed;
displaying a user interface control in the graphical user interface, the user interface control displayed on or proximate the image content;
receiving a user input as a change in position of the user interface control; and
determining the focal length based on the change in position of the user interface control.

2. The method as recited in claim 1, further comprising:
generating a model of the lens based on a stereographic projection model, wherein:
the lens comprises a fisheye lens; and
the focal length is determined based on the model of the lens and the change in position of the user interface control.

3. The method as recited in claim 1, further comprising:
generating a model of the lens based on a perspective projection model, wherein:
the lens comprises a rectilinear lens; and
the focal length is determined based on the model of the lens and the change in position of the user interface control.

4. The method as recited in claim 1, further comprising:
receiving the user input specifying two endpoints in the image content;
determining a curved line based on the two endpoints and a stereographic projection model that is based on a hypothesized focal length;
displaying the curved line in the graphical user interface;
wherein the change in position of the user interface control results in a modified curve of the curved line; and
wherein said determining the focal length based on the change in position comprises adjusting the hypothesized focal length based on the change in position of the user interface control.

5. The method as recited in claim 1, wherein:
the lens comprises a fisheye lens;
the image content comprises a curvature distortion introduced by the fisheye lens; and
the user input of the change in position of the user interface control comprises the user input to match a curve of a line to the curvature distortion.

6. The method as recited in claim 1, further comprising:
projecting the photograph to a view sphere based on a reversed perspective projection model and a hypothesized focal length, wherein:
the image content comprises a two-dimensional image generated based on the view sphere;
the user interface control comprises a handle in a corner of the image content; and
said determining the focal length based on the change in position comprises adjusting the hypothesized focal length based on the change in position of the user interface control.

7. The method as recited in claim 1, wherein:
the lens comprises a rectilinear lens;
the image content comprises a distortion introduced by the rectilinear lens; and
the user input of the change in position of the user interface control comprises the user input to minimize the distortion.

8. A system, comprising:
at least one processor;
a display device; and
a memory coupled to the at least one processor and configured to store program instructions are executable by the at least one processor to:
display image content in a graphical user interface on the display device, the image content derived from a photograph taken with a lens having a focal length that is unknown when the image content is initially displayed;
display a user interface control in the graphical user interface on the display device, the user interface control displayed on or proximate the image content;
receive a user input as a change in position of the user interface control; and
determine the focal length based on the change in position of the user interface control.

9. The system as recited in claim 8, wherein:
the program instructions are executable by the at least one processor to generate a model of the lens based on a stereographic projection model;
the lens comprises a fisheye lens; and
the focal length is determined based on the model of the lens and the change in position of the user interface control.

10. The system as recited in claim 8, wherein:
the program instructions are executable by the at least one processor to generate a model of the lens based on a perspective projection model;
the lens comprises a rectilinear lens; and
the focal length is determined based on the model of the lens and the change in position of the user interface control.

11. The system as recited in claim 8, wherein the program instructions are executable by the at least one processor to:
receive the user input specifying two endpoints in the image content;
determine a curved line based on the two endpoints and a stereographic projection model that is based on a hypothesized focal length;
display the curved line in the graphical user interface on the display device;
wherein the change in position of the user interface control results in a modified curve of the curved line; and wherein to said determine the focal length based on the change in position, adjust the hypothesized focal length based on the change in position of the user interface control.

12. The system as recited in claim 8, wherein:
the lens comprises a fisheye lens;
the image content comprises a curvature distortion introduced by the fisheye lens; and
the user input of the change in position of the user interface control comprises the user input to match a curve of a line to the curvature distortion.

13. The system as recited in claim 8, wherein the program instructions are executable by the at least one processor to:
project the photograph to a view sphere based on a reversed perspective projection model and a hypothesized focal length, wherein
the image content comprises a two-dimensional image generated based on the view sphere;
the user interface control comprises a handle in a corner of the image content; and
to said determine the focal length based on the change in position, adjust the hypothesized focal length based on the change in position of the user interface control.

14. The system as recited in claim 8, wherein:
the lens comprises a rectilinear lens;
the image content comprises a distortion introduced by the rectilinear lens; and
the user input of the change in position of the user interface control comprises the user input to minimize the distortion.

15. A computer-readable non-transitory storage memory comprising stored program instructions that are computer-executable and, responsive to execution of the instructions, a computer device performs:
displaying image content in a graphical user interface, wherein the image content derived from a photograph taken with a lens having a focal length that is unknown when the image content is initially displayed;
displaying a user interface control in the graphical user interface, the user interface control displayed on or proximate the image content;
receiving a user input as a change in position of the user interface control; and
determining the focal length based on the change in position of the user interface control.

16. The computer-readable non-transitory storage memory as recited in claim 15, the program instructions further executable by the computer device to perform:
generating a model of the lens based on a projection model; and
wherein the focal length is determined based on the model of the lens and the change in position of the user interface control.

17. The computer-readable non-transitory storage memory as recited in claim 15, the program instructions further executable by the computer device to perform:
receiving the user input specifying two endpoints in the image content;
determining a curved line based on the two endpoints and a stereographic projection model that is based on a hypothesized focal length;
displaying the curved line in the graphical user interface;
wherein the change in position of the user interface control results in a modified curve of the curved line; and
wherein said determining the focal length based on the change in position comprises adjusting the hypothesized focal length based on the change in position of the user interface control.

18. The computer-readable non-transitory storage memory as recited in claim 15, wherein:
the lens comprises a fisheye lens;
the image content comprises a curvature distortion introduced by the fisheye lens; and
the user input of the change in position of the user interface control comprises the user input to match a curve of a line to the curvature distortion.

19. The computer-readable non-transitory storage memory as recited in claim 15, the program instructions further executable by the computer device to perform:
projecting the photograph to a view sphere based on a reversed perspective projection model and a hypothesized focal length, wherein:
the image content comprises a two-dimensional image generated based on the view sphere;
the user interface control comprises a handle in a corner of the image content; and
said determining the focal length based on the change in position comprises adjusting the hypothesized focal length based on the change in position of the user interface control.

20. The computer-readable non-transitory storage memory as recited in claim 15, wherein:
the lens comprises a rectilinear lens;
the image content comprises a distortion introduced by the rectilinear lens; and
the user input of the change in position of the user interface control comprises the user input to minimize the distortion.

\* \* \* \* \*